(12) United States Patent
Koban et al.

(10) Patent No.: US 10,131,486 B2
(45) Date of Patent: Nov. 20, 2018

(54) CAN TAP

(71) Applicant: CHEMOURS COMPANY FC LLC, Wilmington, DE (US)

(72) Inventors: Mary E Koban, Chadds Ford, PA (US); Stephen James Ferraioli, Thorndale, PA (US); Lewis Robert Jewell, Townsend, DE (US); Anthony F. Stasio, Newark, DE (US); Roderic Nathan Uphaus, Troy, AL (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 14/417,443

(22) PCT Filed: Apr. 12, 2013

(86) PCT No.: PCT/US2013/036424
§ 371 (c)(1),
(2) Date: Jan. 26, 2015

(87) PCT Pub. No.: WO2014/018134
PCT Pub. Date: Jan. 30, 2014

(65) Prior Publication Data
US 2015/0203278 A1 Jul. 23, 2015

Related U.S. Application Data

(60) Provisional application No. 61/676,593, filed on Jul. 27, 2012.

(51) Int. Cl.
*B65D 83/14* (2006.01)
*F16K 1/04* (2006.01)
(Continued)

(52) U.S. Cl.
CPC ............... *B65D 83/14* (2013.01); *F16K 1/02* (2013.01); *F16K 1/04* (2013.01); *F16K 1/303* (2013.01);
(Continued)

(58) Field of Classification Search
CPC .......... F25B 45/00; F17C 13/04; B65D 83/14; F16K 1/04; Y10T 137/6133
(Continued)

(56) References Cited

U.S. PATENT DOCUMENTS 3,795,350 A * 3/1974 Shay ...................... B65D 83/44
222/402.17
4,142,546 A * 3/1979 Sandau .................... F15B 1/08
137/321

(Continued)

OTHER PUBLICATIONS

International Search Report, FL1641WOPCT, PCT/US2013/036424, dated Jul. 8, 2013.
(Continued)

*Primary Examiner* — Kevin Lee

(57) ABSTRACT

Disclosed are can taps for dispensing fluids from containers. The can tap has a housing with an inlet and an outlet, and a pin. The pin has a flow portion in fluidic communication with the inlet and the outlet of the housing. The pin may have a blunt depressor capable of operating a valve on the container. The flow portion of the pin allows fluid to flow between the housing and the pin. The can tap may have a gasket comprising a material having a hardness that prevents deformation of the container.

22 Claims, 10 Drawing Sheets

(51) Int. Cl.
*F16K 1/02* (2006.01)
*F16K 1/30* (2006.01)
*F17C 13/04* (2006.01)
*F25B 45/00* (2006.01)

(52) U.S. Cl.
CPC .............. *F17C 13/04* (2013.01); *F25B 45/00* (2013.01); *Y10T 137/6133* (2015.04)

(58) Field of Classification Search
USPC ......................................................... 137/321
See application file for complete search history.

(56) References Cited

U.S. PATENT DOCUMENTS

| | | | |
|---|---|---|---|
| 4,420,012 A | 12/1983 | Astrom | |
| 4,899,780 A * | 2/1990 | Astrom | B67B 7/42 137/319 |
| 5,413,138 A | 5/1995 | Astrom | |
| 5,479,955 A | 1/1996 | Roodvoets et al. | |
| 5,655,968 A * | 8/1997 | Burton | F16C 3/03 277/562 |
| 5,876,040 A * | 3/1999 | Adams et al. | F16L 5/10 277/496 |
| 2004/0134457 A1* | 7/2004 | Evans | F16J 9/206 123/193.4 |
| 2005/0016186 A1 | 1/2005 | Tom | |
| 2011/0041522 A1* | 2/2011 | Carrubba | F16K 1/308 62/77 |
| 2012/0080100 A1 | 4/2012 | Uphaus | |

OTHER PUBLICATIONS

Westinghouse pressurized water reactor nuclear power plant manual, © 1984, Westinghouse Electric Corporation, Water Reactor Division.

* cited by examiner

CAN TAP

This application represents a national filing under 35 U.S.C. 371 of International Application No. PCT/US13/36424 filed Apr. 12, 2013, and claims priority of U.S. Provisional Application No. 61/676,593 filed Jul. 27, 2012.

BACKGROUND INFORMATION

Field of the Disclosure

This invention relates to can taps for use with containers for dispensing materials. More specifically, this invention relates to can taps for dispensing refrigerants from pressurized containers.

Description of the Related Art

Chlorofluorocarbon (CFC), hydrochlorofluorocarbon (HCFC), hydrofluorocarbon (HFC), and hydrofluoroolefin (HFO) compounds have been used extensively as refrigerants, as well as propellants and cleaning solvents. In response to global warming and ozone depletion concerns, new environmental pressures are continuously being exerted on refrigerant service technicians. Refrigeration and air-conditioning (a/c) systems commonly lose refrigerants due to system fatigue, servicing, and/or normal system leakage. Therefore, refrigeration and a/c systems need to be re-charged by adding refrigerant. In the automotive aftermarket, it is very common to recharge a/c systems with small (typically 12 oz. or 1 kg), pressurized refrigerant containers. Small pressurized containers are often used in the mobile aftermarket because of their portability and ability to be taken to the vehicle and re-charge the vehicle, even by do-it-yourself mechanics.

Small aftermarket refrigerant containers are typically provided as single use type containers. These containers normally have a thin metal seal that is destroyed in liberating the refrigerant. A can tap having a needle-shaped pin (which may be referred to as a "piercing tap") pierces the thin metal seal and allows the contents to be dispensed. An example of such a piercing tap for use with such a can is shown in FIG. 12. Piercing tap 1200 has pin 1220 having needle-shaped tip 1226 that pierces the thin metal seal of a can. An example of a can with a thin metal seal that can be pierced with a piercing tap is shown in FIG. 13.

The cans and can taps presently on the market have several disadvantages. Due to the thin metal seal on the can which must be pierced and ultimately destroyed to dispense the contents, the can cannot be resealed. Therefore, the cans can only be used once before they are discarded. If all of the contents are not used, the excess refrigerant is wasted. Not only does the excess refrigerant represent lost money, but the excess refrigerant is generally released into the atmosphere, which may have environmental implications.

Another issue often encountered with the piercing-type can taps (piercing taps) is inconsistent and/or stopped flow. If the needle-shaped pin is inserted too far into the can, the needle pin will block the flow of the contents out of the can. If the pin is not inserted far enough, the hole in the metal seal may be small and restrict the flow of material out of the can. In typical use, the pin must be inserted and then drawn completely out to achieve optimum flow. However, when technicians actuate the can tap, for example by turning a handle, and begin to remove the pin out of the can, the refrigerant normally starts to flow, so the technician may not fully dis-engage the pin. Finding the best flow or "sweet spot" requires practice to identify when the contents are being properly dispensed.

Cans that are self-sealing (i.e., have a seal that is capable of resealing itself) have recently been introduced in the automotive aftermarket. There are two versions of self-sealing cans. These include external spring-actuated and internal spring-actuated plug type self-sealing cans (which may be referred to as external plug can(s) and internal plug can(s), respectively, singular and plural). The external plug can is well known and there are many taps and/or tap assemblies that are used to liberate product within an external plug can. An example of an external plug can is shown in FIG. 14.

The internal spring-actuated plug type self-sealing can is a newer design. An example of an internal plug can is shown in FIG. 15. At this time, there are no can taps that are specifically designed to work with the new internal plug cans. The seal on these cans have a spring-actuated plug that remains in a sealed position until the plug is depressed. The internal plug can has several advantages over the external plug can. The internal plug design is more robust and may be less prone to damage as the plug portion is contained within can and not external to can. The internal plug can design may also have generally higher flow rate versus the external plug can.

Currently available piercing can taps can be used to release the contents of an internal plug can, but have several drawbacks. First, the needle-shaped pin may damage the plug and/or the seal and may destroy the can's ability to release refrigerant. Second, piercing can taps also provide an inconsistent flow rate similar to the previous can designs. Third, depending on the material of construction of the needle-shaped pin, some pins cannot even sufficiently depress a spring-actuated plug to liberate refrigerant.

It is therefore desirable to develop a system that may overcome one or more of the disadvantages of the currently available products.

It may be desirable to provide a robust can and tap system that is capable of being resealed. Having a robust resealable can and tap system may allow for less material being wasted by allowing the entire contents of the can to be used for the intended purpose. Less waste may also lead to lower costs and less environmental impact.

It may also be desirable to provide a system that is easier to use and/or may yield more consistent results. For example, it may be desirable to provide a system that provides a high and/or consistent flow rate without the need to find the "sweet spot" of the pin.

SUMMARY

In at least one embodiment of the present disclosure, a can tap comprises:
- a housing having a body, a lower end having an inlet, an upper end having an outlet, a throat between the lower end and the upper end;
- a pin located within the housing having an upper end secured to the housing body, a lower end having a blunt depressor suitable for contact with a can having a top in which is positioned a valve, wherein the blunt depressor is capable of operating the valve of the can, and a flow portion between the upper end and the lower end of the pin located within the housing throat wherein the flow portion allows fluid to flow between the housing and the pin; and
- a tap outlet in fluid communication with housing outlet at the upper end of the housing.

In accordance with at least one embodiment of the present disclosure, a can tap comprises:

a housing having a body, a lower end having an inlet, an upper end having an outlet, a throat between the lower end and the upper end;

a pin located within the housing having an upper end secured to the housing body, a lower end having a blunt depressor suitable for contact with a can having a top in which is positioned a valve, wherein the blunt depressor is capable of operating the valve of the can, and a flow portion between the upper end and the lower end of the pin located within the housing throat wherein the flow portion allows fluid to flow between the housing and the pin and wherein the flow portion is in fluid communication with the housing inlet and the housing outlet; and a tap outlet in fluid communication with housing outlet at the upper end of the housing; and a gasket positioned adjacent to the housing at or near the housing inlet, wherein the gasket comprises a material having a hardness ranging from about 70 durometers to about 100 durometers.

The foregoing general description and the following detailed description are exemplary and explanatory only and are not restrictive of the invention, as defined in the appended claims.

DETAILED DESCRIPTION

Figure 1:
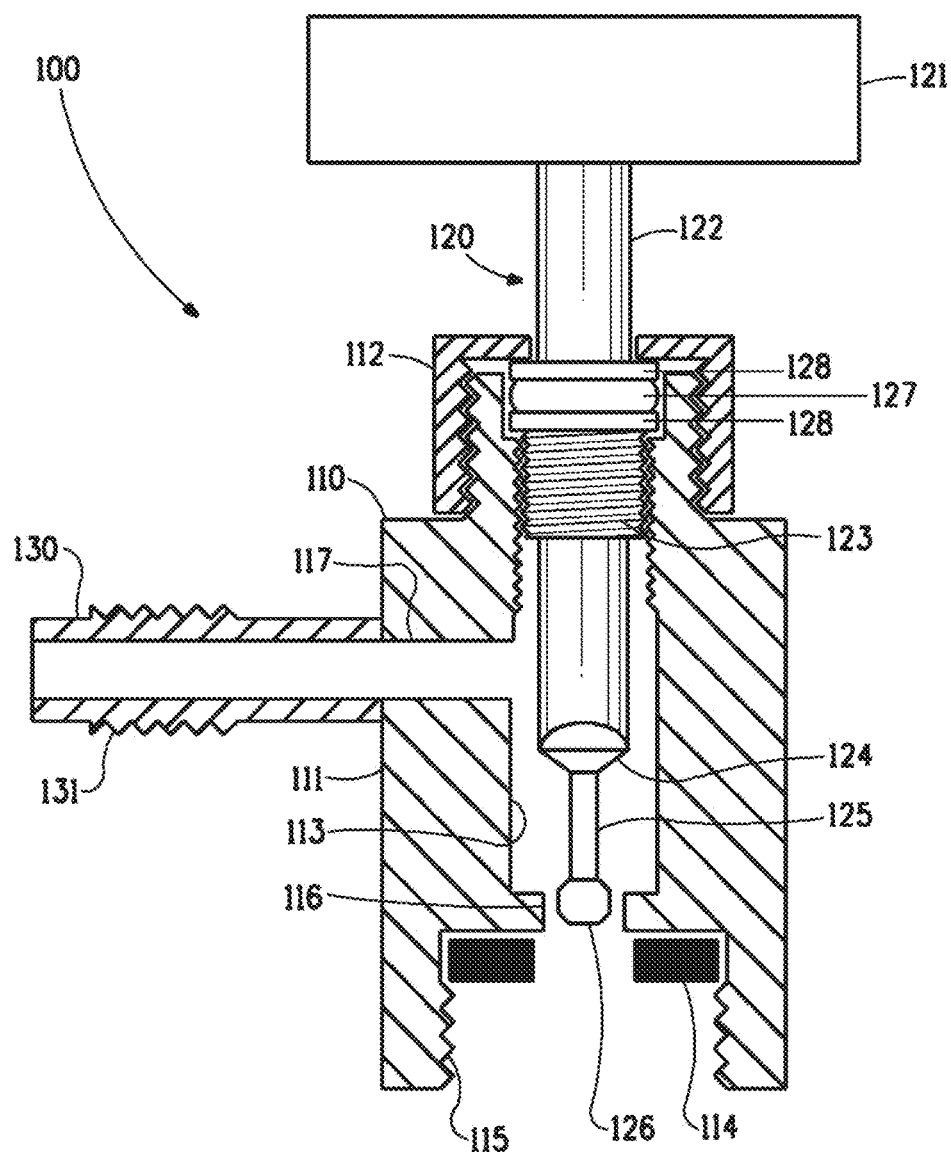
FIG. 1 shows a partial cutaway view of a can tap as disclosed herein.

Before addressing details of embodiments described below, some terms are defined or clarified.

As used herein, the terms "can," "container," "vessel," "bottle," and variations thereof, are used interchangeably to describe an item used to hold a fluid. In at least some embodiments, the fluid contents may be pressurized. For use with the can tap disclosed herein, the can has a top in which a valve is positioned, with the can capable of being affixed to a suitable can tap. The valve may be a self-sealing valve and capable of having a closed or sealed position and an open position.

As used herein, the terms "tap" or "can tap" refers to a mechanical device capable of opening a container and dispensing the contents therein therefrom.

As used herein, the term "pin" refers to the portion of the tap that creates the opening in the container through which the contents may flow from the container through the tap. The term "depressor" refers to the portion of the pin that presses against the seal of the can when the tap is in use. The phrase "capable of operating a valve of a can" means that when the tap is affixed to a can, the depressor, when actuated, is capable of opening and closing a valve by actuating (moving) the pin, for example, turning a handle, so that upon sufficient descent of the pin, the valve changes from a closed position to an open position. The closed position is the position where fluid is not being dispensed, and the open position is the position where fluids may be dispensed.

As used herein, the term "blunt" refers to a surface that is devoid of a sharp point, wherein a sharp point is one defined as having an angle less than 90 degrees.

In the FIGURES, identical features are identified using the same number and similar features may be identified with similar numbers.

In accordance with at least one embodiment of the present disclosure, a can tap comprises a housing, a pin having a depressor, and a gasket, wherein the gasket comprises an elastic material having a hardness that minimizes deformation of a can.

In at least one embodiment, the pin has a flow portion that allows fluid to flow between the housing and the pin.

In accordance with at least one embodiment of the present disclosure, at least part of the flow portion may have a dimension (width) in a first direction perpendicular to the central axis of the pin that is greater than (e.g., at least twice as great as) a dimension (width) in a second direction perpendicular to the central axis of the pin. The first direction may be, for example, rotated 90 degrees from the second direction. In such embodiments, at least a part of the flow portion may have a flattened surface that allows fluid to pass over the flattened surface between the flow portion and the housing.

In accordance with at least one embodiment of the present disclosure, at least part of the flow portion may be rotationally symmetrical around the central axis of the pin. The flow portion may be cylindrical.

In at least one embodiment, the pin shaft and the flow portion are both cylindrical. The diameter of the flow portion may be smaller than the diameter of the pin shaft.

In accordance with at least one embodiment of the present disclosure, at least part of the flow portion may have a dimension (width) in a first direction perpendicular to the central axis of the pin that is greater (e.g., at least twice as great) than a dimension (width) in a second direction perpendicular to the central axis of the pin, and at least part of the flow portion may be rotationally symmetrical around the central axis of the pin. At least part of the flow portion may have a flattened surface. At least part of the flow portion may be cylindrical.

According to at least one embodiment of the present disclosure, a can tap may comprise a housing and a pin and a tap outlet. The housing may have a body, a lower end having an inlet, an upper end having an outlet, and a throat between the lower end and the upper end. The pin may have an upper end secured to the housing body, a lower end having a blunt depressor suitable for contact with a can, the can having a top in which is positioned a valve, and a flow portion between the upper end and the lower end of the pin. The blunt depressor is capable of operating the valve of the can. The flow portion allows fluid to flow between the housing and the pin and wherein the flow portion is in fluid communication with the housing inlet and the housing outlet.

In an embodiment of the present disclosure, the can tap can be affixed to and detached from a can at least about 5 times without deforming the can. In certain embodiments, the can tap can be attached and detached from a can more than about 5 times without deforming the can, for example, more than about 10 times.

In an embodiment of the present disclosure, the can tap is used with a can containing a fluid and the can tap is capable of delivering a constant flow rate of fluid of at least about 2.0 g/sec when the can has a starting pressure of 662 kPa (96 psia). In another embodiment, the can tap can deliver a constant flow rate of fluid of at least about 3.0 g/sec or at least about 5.0 g/sec when the can has a starting pressure of 662 kPa (96 psia).

In at least one embodiment, the flow portion of the pin is a hollow shaft that has at least one opening to allow fluid to pass through the hollow shaft to the housing outlet.

In at least one embodiment, the flow portion of the pin is or has a hollow shaft having one or more openings, for example, openings along a side of the pin at the lower end of the pin adjacent to or near the depressor, in fluid communication with the housing inlet and housing outlet, to allow fluid to pass into and out of the hollow shaft.

The hollow shaft may have one or more openings along the shaft at a location remote from the depressor which may, for example, be proximal to a housing outlet, to allow fluid flow into and out of the pin hollow shaft to the housing and housing outlet and subsequently through the tap outlet.

The pin may have or terminate in a solid depressor that may contact a plug of a can seal. The seal/plug may seal a valve positioned in the can to prevent fluid from escaping a sealed can.

In embodiments where the pin has a hollow shaft, the pin may terminate in an open depressor such that the depressor is ring shaped and fluid flows through the center of the depressor into the hollow shaft, which is in fluid communication with the housing inlet.

As one of ordinary skill in the art would recognize, the flow portion of the pin may have any geometry that allows fluid to flow between the can and the tap outlet. One of ordinary skill in the art will also recognize that the geometry may be designed to provide a desired flow rate. For example, when the flow portion of the pin is a hollow shaft, a larger flow portion may provide for a greater flow rate, or a smaller flow portion may be desirable to result in a lower flow rate, while dependent on other factors, such as, for example, the relative dimensions of the housing throat and the internal diameter of the hollow shaft.

Similarly, one of ordinary skill in the art would also recognize that the geometry of the flow portion may be designed such that it promotes a particular fluid behavior, such as through the use of baffles or projections that cause greater mixing of the fluid through more turbulent flow.

According to the present disclosure, the depressor has a shape such that it may open a can, such as, for example open a valve, on a can to thereby open a can. The valve may be a self-sealing valve on a can. The depressor may be designed to minimize and/or prevent damage to the can or valve. For example, the depressor may have a relatively flat portion that contacts the valve to evenly distribute pressure. As one of ordinary skill in the art will recognize, the depressor should be designed such that it opens the can, that is opens the valve, such as a self-sealing valve, while also allowing fluid to exit from the can.

The depressor of the present disclosure may have a blunt surface that contacts the valve of the can. The blunt surface may be flat, curved, faceted, or dully pointed (i.e., having an angle at the tip of greater than 90 degrees). The depressor may have curved or straight sides. The depressor may also have chamfered or rounded edges.

In at least one embodiment, the depressor may have a bulbous shape.

In accordance with at least one embodiment of the present disclosure, the pin may further have a structure positioned along the flow portion of the pin to limit the distance the pin may descend when the pin is engaged, that is, a pin limiter. The tap housing may have a stop that is engaged by the pin limiter. For example, the pin limiter may have shoulders that engage the stop. The stop may be positioned along the housing throat at or near the housing inlet. The stop may be, for example, an annular protrusion that projects outward from the housing at or near the housing inlet. A pin limiter having at least one shoulder and the stop may be sized such that at least one shoulder contacts the stop to limit the distance the pin can descend. The pin limiter may be positioned to provide an optimum opening between the pin and the housing.

The tap of the present disclosure may also comprise a gasket wherein the gasket is positioned adjacent to the housing or at or near the housing inlet, and is further positioned so as to be capable of contacting a can when the tap is affixed to a can. The gasket may provide a seal between the can and the tap. Additionally, the gasket may be used to minimize or prevent deformation of the can when the tap is placed on the can.

The gasket may comprise an elastic material (e.g., elastomer) that may cushion the top of the can. A material that is too soft may compress too easily and offer little protection to the can. A material that is too hard will not compress enough and will similar afford little protection to the can. The gasket may comprise a material that at least partially but not completely compresses when the can tap is placed on the can. Compression may be, for example, at least about 1%, 5%, 10%, 20%, 30%, or 50%, or more, but is less than 100%, for example, compression may be less than about 90%, 75%, 60%.

Examples of materials that may be used for the gasket may include ABS, acetal, epoxy, fluorocarbons, PTFE, ETFE, PVDF, ionomer, Polyamide 6/6 Nylon, polyarylate, polycarbonate, polyester, PBT, PET, polyetherimide, polyethylene, polyphenylene oxide, polyphenylene sulfide, polypropylene, polystyrene, polysulfone, polyvinyl chloride, Buna N, Hypalon 48, and Thiokol FA.

The gasket may comprise a material having a hardness ranging from about 70 durometers to about 100 durometers.

In at least one embodiment, the gasket comprises a material having a hardness ranging from about 80 durometers to about 90 durometers. The gasket may be selected from a material having a hardness that at least partially compresses, but does not fully compress, when the tap is mated to the can.

The size of the gasket may also be adjusted based on the material used so that the tap does not deform the can when the tap is attached to the can.

The tap may comprise any known material that is able to withstand the pressure of the can and that is resistant to the fluid contained within the can. Materials may include, for example, stainless steel, galvanized steel, aluminum, brass, bronze, plastic, etc. Pressures within the cans may be at least 662 kPa (96 psia), such as at least 689 kPa (100 psia), at least 758 kPa (110 psia), at least 827 kPa (120 psia), or higher. In at least one embodiment, the material comprising the tap should be strong enough to withstand such pressures up to at least 1.38 MPa (200 psia).

An exemplary can tap is shown in FIG. 1. In FIG. 1 and in the subsequent figures, the housing is shown in a cutaway view to expose the pin located within the housing. Can tap 100 comprises housing 110, gasket 114, stop 116, pin 120, and tap outlet 130. Housing 100 has a housing body 111 and a nut 112 that secures pin 120 to housing body 111. Housing 110 further has a throat 113, which is in fluid communication with housing outlet 117. Stop 116 is an annular protrusion that acts to prevent pin 120 from descending too far into a can (not shown). Threads 115 are capable of matingly engaging a can, which can has threads that conform to threads 115 of gasket 114.

Pin 120 has handle 121 that can be turned to raise or lower pin shaft 122, which engages housing 110 through threads 123. A fluid-tight engagement between housing 110 and pin 120 is maintained through two washers 128 and o-ring 127 mounted on shaft 122. Shoulders 124 are sized so as to engage with stop 116 to limit descent of pin 120. Pin 120 further has flow portion 125 which is narrower than shaft 122. Pin 120 terminates in depressor 126.

Can tap 100 comprises tap outlet 130 that can accommodate a hose or other connector through threaded portion 131 to carry fluid from a can.

Figure 2:
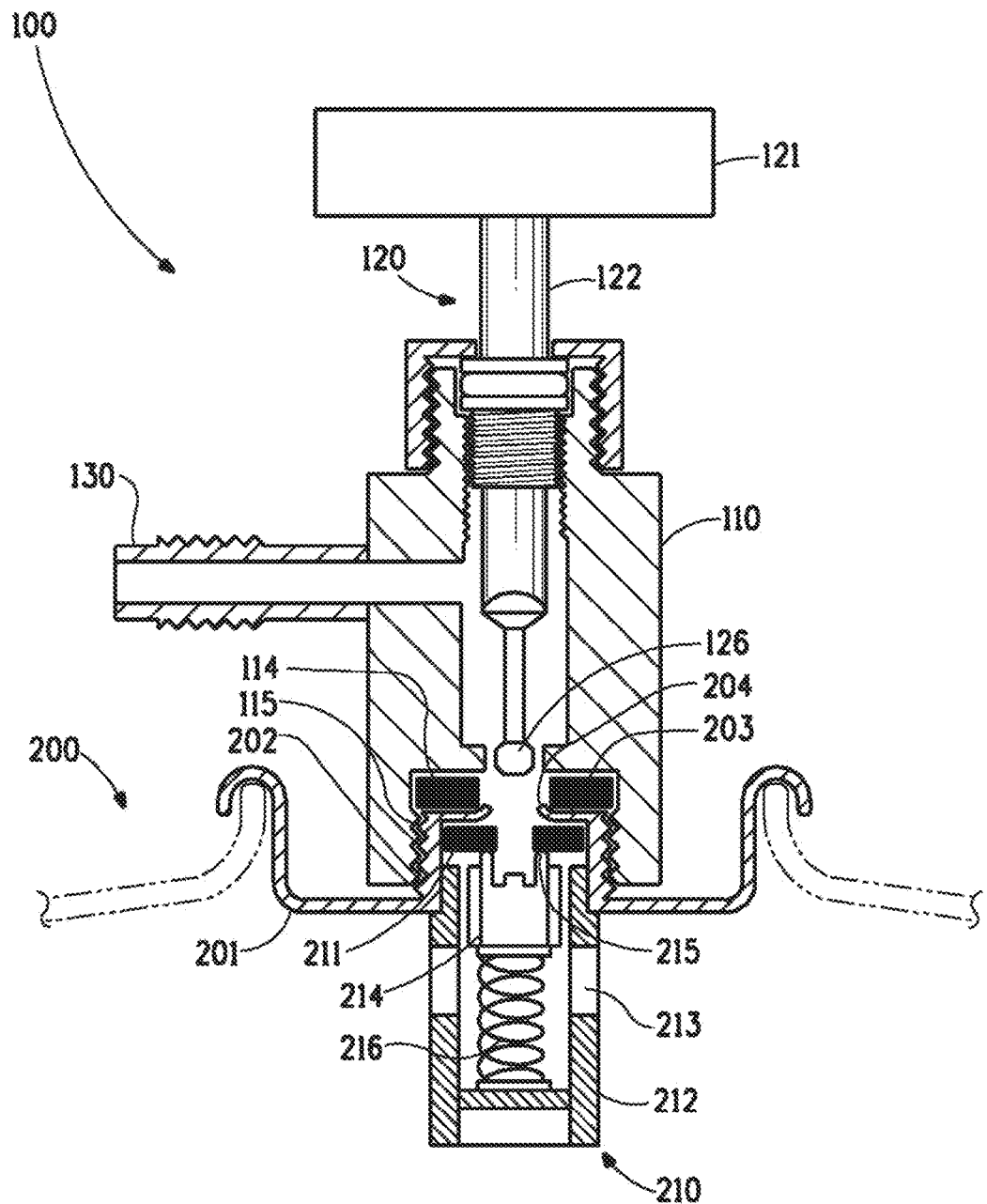
FIG. 2 shows a partial cutaway view of a can tap in a closed state affixed to a can as disclosed herein.

FIG. 2 shows can tap 100 of FIG. 1 affixed to can 200 and engaged with self-sealing valve 210 of can 200. Self-sealing valve 210 is shown in the closed or sealed position, i.e., valve 210 has not been actuated by tap 100. Can top 201 has threaded portion 202 that engages threads 115 of housing 110. Top 203 of valve 210 has upraised crown 204 that has an opening through which depressor 126 of pin 120 can pass. O-ring 211 seals the top of valve 210 and plug 214 presses against o-ring 211 with the aid of spring 216 to prevent fluid from escaping can 200 when not engaged by can tap 100. In the example shown in FIG. 2, plug 214 has stop 215 that is a raised annular projection that contacts o-ring 211. Valve body 212 has openings 213 through which fluid can pass when plug 214 is depressed.

Gasket 114, handle 121, pin shaft 122, and tap outlet 130 are the same as discussed for FIG. 1.

Figure 3A:
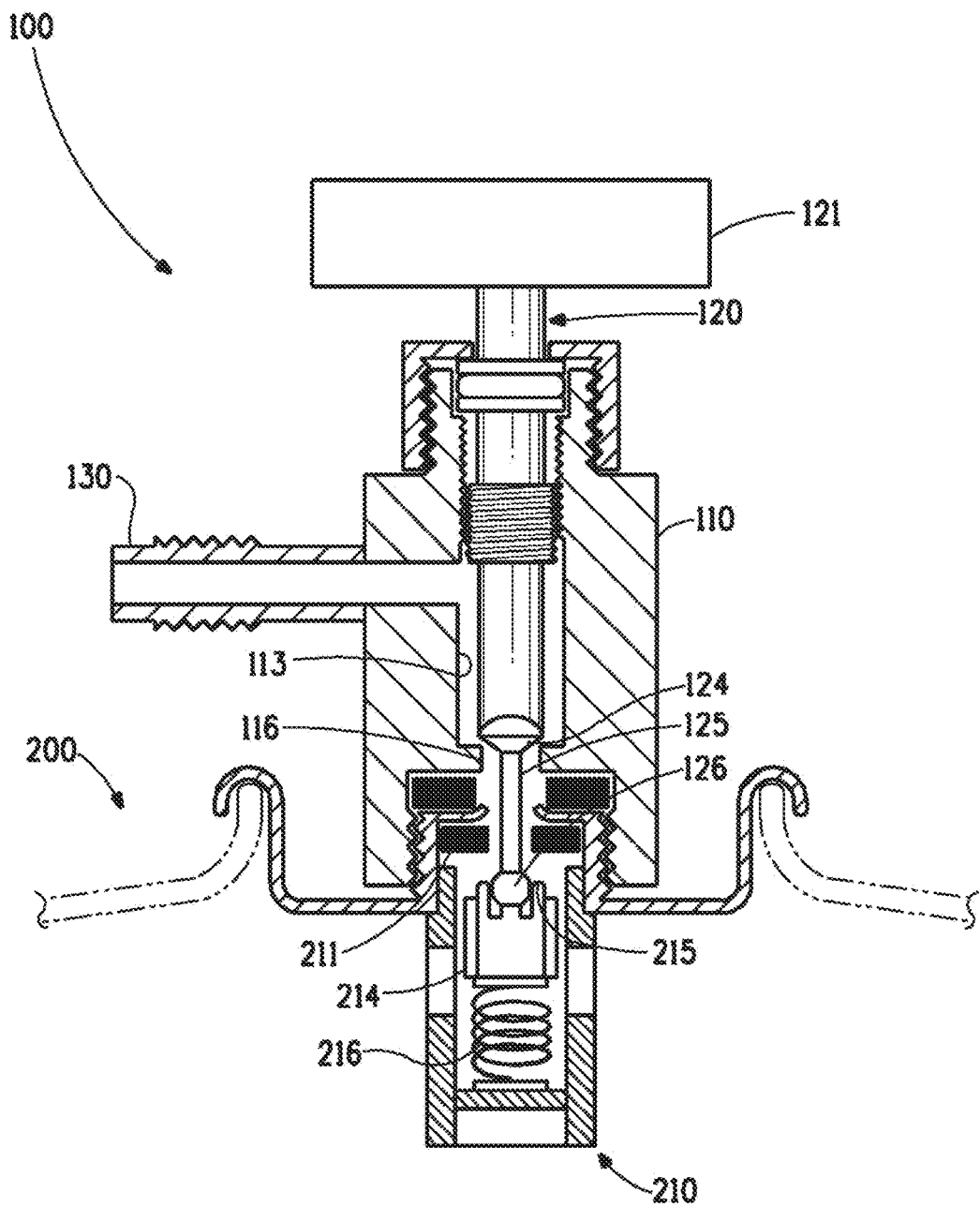
FIG. 3A shows a partial cutaway view of a can tap in an open state affixed to a can as disclosed herein.
Figure 3B:
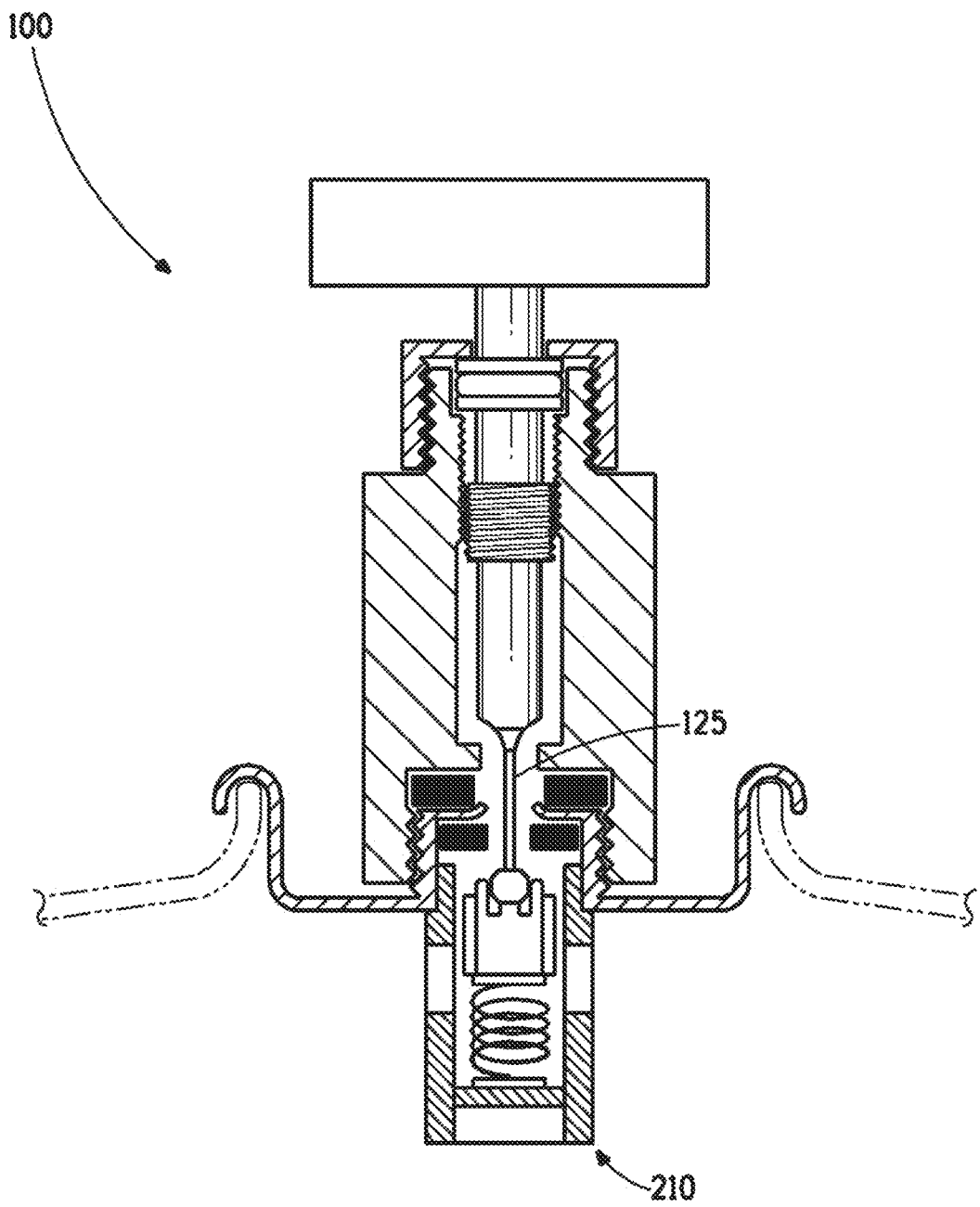
FIG. 3B shows the can tap of FIG. 3A rotated 90 degrees.

FIGS. 3A and 3B show can tap 100 of FIGS. 1 and 2, but for FIGS. 3A and 3B, in contrast to FIG. 2, self-sealing valve 210 is shown in the open position wherein handle 121 of pin 120 has been turned to cause pin 120 to descend.

In FIG. 3A, depressor 126 has engaged and depressed plug 214 by compressing spring 216. Depression of plug 214 disengages stop 215 from o-ring 211, allowing fluid to pass from can 200 through valve 210 and into tap 100. Flow portion 125 of pin 120 allows fluid to enter throat 113 of housing 110, and fluid then exits through tap outlet 130.

In the open position as shown in FIG. 3A, shoulder 124 of pin 120 engages stop 116 of housing 110, preventing pin 120 from descending further into valve 210.

FIG. 3B shows can tap 100 of FIGS. 1, 2 and 3A. In contrast to FIG. 3A, FIG. 3B shows self-sealing valve 210 and can tap 100 of FIG. 3A rotated by 90 degrees. In FIG. 3B, flow portion 125 is shown having a flattened portion that provides a passageway for fluid to flow. As one of ordinary skill in the art would recognize, the thinnest dimension of flow portion 125 directly affects both the maximum possible fluid flow as well as the durability/strength of can tap 100. The thinner the dimension of the flow portion, the greater amount of fluid can pass. However, thinner flow portions also result in a weaker structure, which may lead to earlier pin failure due to bending or breaking. A flow portion may be designed to withstand the pressure exerted when depressing the plug of the valve while maximizing the amount of fluid that may pass.

Figure 4:
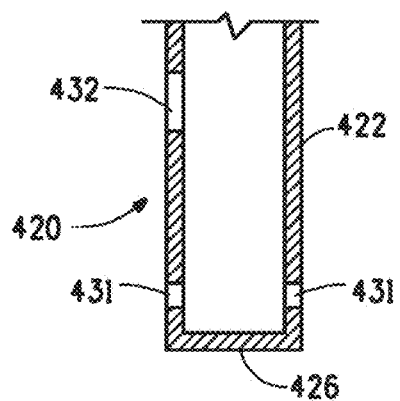
FIG. 4 shows a cutaway view of a can tap pin having solid depressor as disclosed herein.
Figure 5:
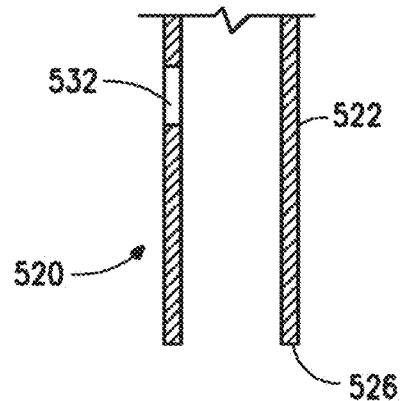
FIG. 5 shows a cutaway view of a can tap pin having a ring-shaped depressor as disclosed herein.

FIGS. 4 and 5 show alternative embodiments of a pin in accordance with the present disclosure.

In FIG. 4, pin 420 has hollow shaft 422 that terminates in a solid depressor 426. Openings 431 are located in hollow shaft 422 adjacent to depressor 426 to allow fluid to enter into hollow shaft 422. Fluid can then exit through opening 432, which is remote from depressor 426 and in fluid communication with the housing outlet (not shown).

FIG. 5 shows pin 520 having a hollow shaft 522 that terminates in an open depressor 526, which has a ring-shaped cross-section. Fluid enters hollow shaft 522 through depressor 526 and can exit through opening 532, which is remote from depressor 526 and in fluid communication with the housing outlet (not shown).

FIGS. 6-9 show further exemplary embodiments of pins in accordance with the present disclosure.

Figure 6A:
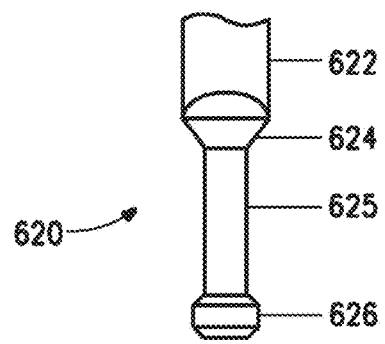
FIGS. 6A and 6B show two views of a can tap pin having a flow portion with a flattened profile as disclosed herein.
Figure 6B:
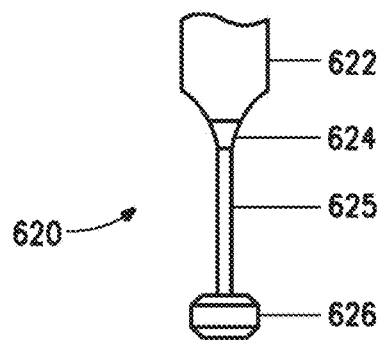

FIGS. 6A and 6B show two illustrations of the same pin. FIG. 6A is rotated 90 degrees from the position of FIG. 6B. Pin 620 has shaft 622 which tapers through shoulder 624 to flow portion 625. Pin 620 terminates in depressor 626. Shoulder 624 may be sized to contact a stop (not shown) within the can tap (not shown) to control the extent to which pin 620 may descend into a valve (not shown) on a can (not shown). Flow portion 625 has a flattened profile with a width in a first direction perpendicular to the central axis of pin 620 that is greater than the width in a second direction perpendicular to the central axis of pin 620 wherein the first direction is 90 degrees from the second direction. As shown, the width of flow portion 625 is greater in the view shown in FIG. 6A than is the width of flow portion 625 in the view shown in FIG. 6B.

Figure 7A:
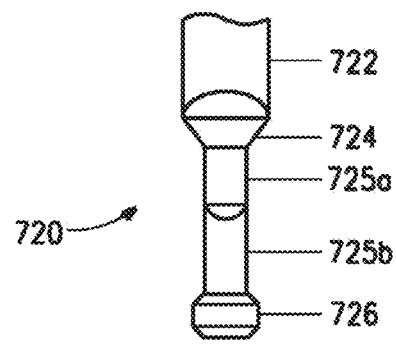
FIGS. 7A and 7B show two views of a pin of a can tap pin having a flattened flow portion and a cylindrical flow portion as disclosed herein.
Figure 7B:
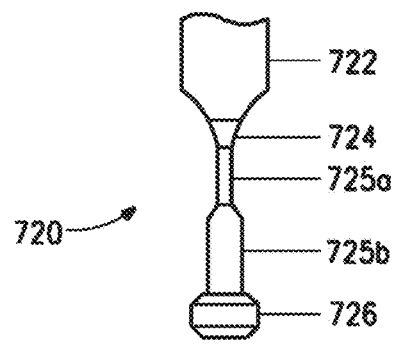

FIGS. 7A and 7B show two illustrations of the same pin. FIG. 7A is rotated 90 degrees from the position of FIG. 7B. Pin 720 has shaft 722 which tapers through shoulder 724 to flow portion 725a and 725b. Pin 720 has a flow portion divided into two distinct parts, a flat flow portion 725a and a cylindrical flow portion 725b. Flat flow portion 725a may be adjacent to the shaft 722, as shown, or flat flow portion 725a may be adjacent to depressor 726 (not shown). The position of flat flow portion 725a and cylindrical flow portion 725b, may be chosen based on the shape of a plug in a valve of a can and/or housing of a can tap. The relative size of the flat and cylindrical flow portions may be adjusted to optimize the desired flow rate of the fluid. For example, if the flat flow portion was made larger with respect to the cylindrical flow portion, the flow rate may be increased.

Conversely, if the flat flow portion was made smaller with respect to the cylindrical flow portion, the flow rate may be decreased.

Figure 8A:
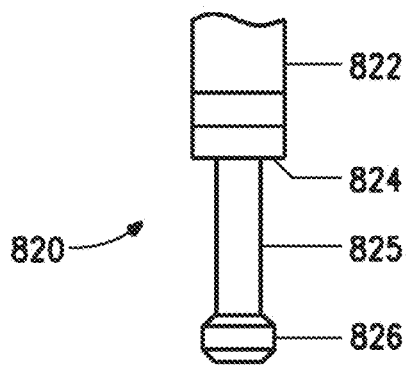
FIGS. 8A and 8B show two views of a can tap pin having a flow portion with a flattened profile and a squared-off shoulder profile as disclosed herein.
Figure 8B:
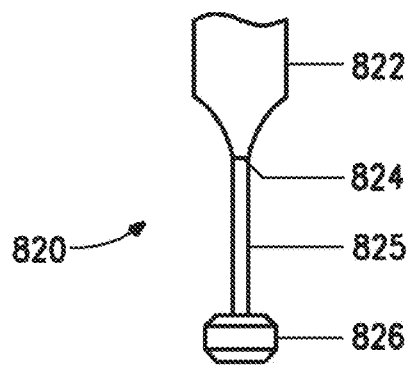

FIGS. 8A and 8B show two illustrations of the same pin. FIG. 8A is rotated 90 degrees from the position of FIG. 8B. In FIGS. 8A and 8B, pin 820 has a shape similar to that of pin 620 shown in FIGS. 6A and 6B. Pin 820 has shaft 822 which tapers through shoulder 824 to flow portion 825. However the shape of shoulder 824 is different than the shape of shoulder 624. Shoulder 824 has a squared-off profile rather than an angled profile. Pin 820 terminates in depressor 826.

Figure 9A:
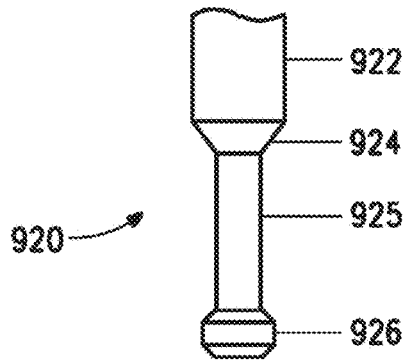
FIGS. 9A and 9B show two views of a can tap pin having shaft, shoulder and flow portion rotationally symmetrical around the central axis of the pin as disclosed herein.
Figure 9B:
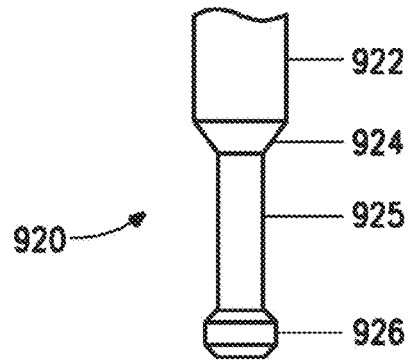

FIGS. 9A and 9B show two illustrations of the same pin. FIG. 9A is rotated 90 degrees from the position of FIG. 9B. FIGS. 9A and 9B show pin 920 wherein shaft 922, shoulder 924, and flow portion 925 are all rotationally symmetrical around the central axis of pin 920. FIG. 9B, is identical to FIG. 9A, meaning to show pin 920 that the profile is the same on all sides of pin 920. Pin 920 terminates in depressor 926.

FIGS. 10A-10E show various depressor geometries. These examples of depressor geometries are non-limiting and exemplary only of selected varieties of shapes the depressor may have. Although the depressors shown have a cylindrical cross-section, the cross-section may have any geometry and may be selected based on the size and/or shape of the valve or other criteria.

Figure 10A:
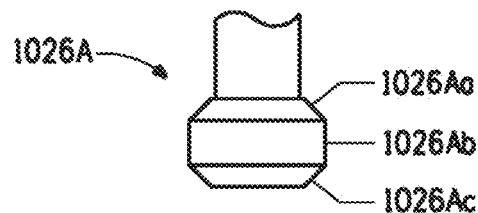
FIGS. 10A-10E show different depressor geometries as disclosed herein.

Depressor 1026A shown in FIG. 10A has an angled top 1026Aa, vertical sides 1026Ab, and an angled bottom 1026Ac.

Figure 10B:
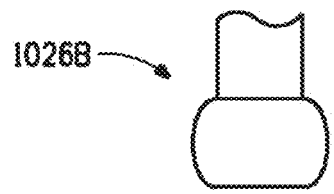

Depressor 1026B shown in FIG. 10B has a rounded shape.

Figure 10C:
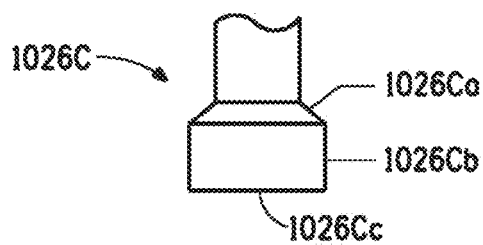

Depressor 1026C shown in FIG. 10C is similar to depressor 1026A, having angled top 1026Ca and vertical sides 1026Cb. Bottom 1026Cc of depressor 1026C is flat.

Figure 10D:
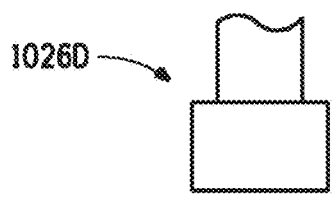

Depressor 1026D shown in FIG. 10D has vertical sides and a flat bottom. The edges have not been chamfered.

Figure 10E:
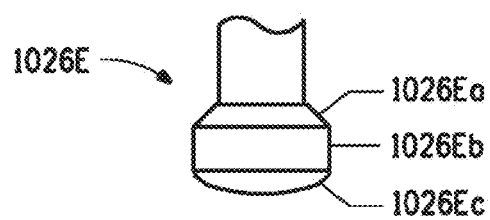

Depressor 1026E shown in FIG. 10E has angled top 1026Ea, vertical sides 1026Eb, and rounded bottom 1026Ec.

Figure 11:
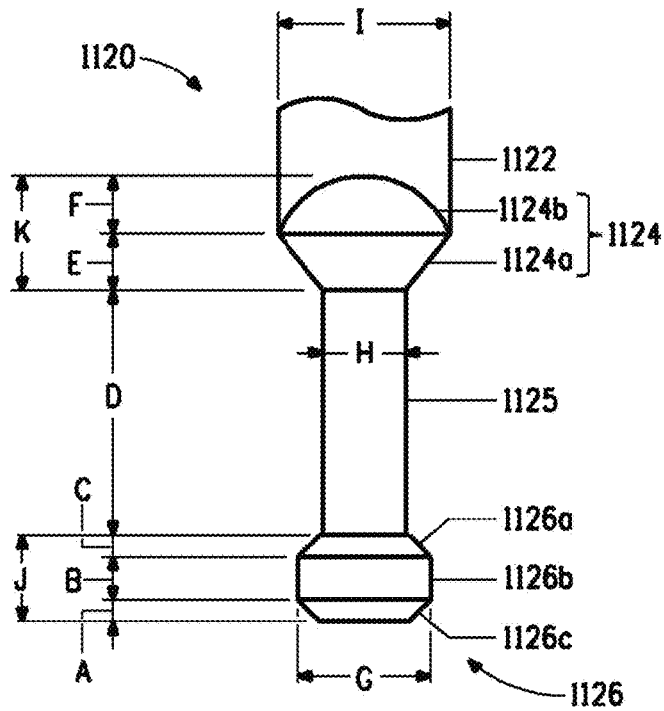
FIG. 11 shows an enlarged view of a pin of a can tap as disclosed herein.

FIG. 11 shows an enlarged version of a pin in accordance with an embodiment of the present disclosure. Pin 1120 is an exemplary pin for a can tap designed for use with a can of pressurized refrigerant. One of ordinary skill in the art will recognize that any or all of the dimensions may be changed to conform to the desired use of the can tap. Depressor 1126 is divided into three regions, a top part 1126a, a middle part 1126b, and a bottom part 1126c. Depressor 1126 has a length J ranging from about 2 mm to about 3 mm, such as from about 2 mm to about 2.5 mm. Top part 1126a and bottom part 1126b, each have a length C and A, respectively, of about 0.5 mm to about 0.75 mm, and middle part 1126b has a length B of about 1 mm to about 2 mm. In the various embodiments shown in FIGS. 10A-10E, it can be seen that any one of the individual parts, that is, top part, middle part, and bottom part, may range from about 0 mm to about 3 mm. Diameter G of depressor 1126 ranges from about 2.5 mm to about 4.5 mm.

Flow portion 1125 of pin 1120 has length D ranging from about 4 mm to about 7 mm, such as, for example, from about 5 mm to about 6.5 mm. Flow portion 1125 has a maximum dimension H perpendicular to the central axis of pin 1120 ranging from about 1.5 mm to about 2.5 mm.

Shoulder 1124 of pin 1120 has length K ranging from about 3 mm to about 4.5 mm. Angled portion 1124a of shoulder 1124 has a length E of about 1.5 mm to about 2 mm, and transition portion 1124b of shoulder 1124 that transitions from flow portion 1125 to shaft 1122 has a length F of about 1 mm to about 2 mm.

Shaft 1122 of pin 1120 has a diameter ranging from about 3 mm to about 5 mm.

One of ordinary skill in the art will recognize that the geometry of the flow portion may comprise any known geometry and is not limited to cylindrical shapes, as depicted in the drawings. Other shapes may be used depending on the desired flow rate of the fluid, the geometry of the tap housing and/or the valve, the machinery and/or method used to fabricate the pin, etc.

In accordance with various embodiments of the present disclosure, the depressor may have any number of shapes. In at least one embodiment, the depressor may be shaped such that it avoids damaging the top of the can or the valve. For example, a depressor may be shaped such that it does not contact an upraised crown on a can top, such as, for example, as shown in FIG. 2. Further, the depressor may be shaped such that it clears an o-ring that seals the top of a valve without damaging the o-ring when the depressor descends through the valve or when the depressor ascends through the valve on removal. Damage to the top of a can or valve (e.g., the o-ring) may lead to premature failure of the valve and cause the can to leak or to prevent the tap from opening the valve.

FIGS. 12-15 are illustrative of prior art and are described hereinabove.

EXAMPLES

The concepts described herein will be further described in the following examples, which do not limit the scope of the invention described in the claims.

Example 1

The exemplary pin 1120 of FIG. 11 was used in experiments to measure the flow rate of a can tap to dispense refrigerant from a pressurized can, wherein the pressure within the can was 662 kPa (96 psi). The flow rate ranged from about 1.7 g/sec to about 2.2 g/sec. The average measured flow rate was about 2.1 g/sec.

Example 2

In Example 2, the pin used in the can tap had the design shown in FIGS. 8A and 8B. Under the same conditions as Example 1, the flow rate ranged from about 0.6 g/sec to about 1.8 g/sec.

Example 3

In Example 3, the pin used in the can tap had the design shown in FIGS. 7A and 7B. Under the same conditions as Example 1, the flow rate ranged from about 1.0 g/sec to about 2.3 g/sec.

Comparative Example

Figure 12:
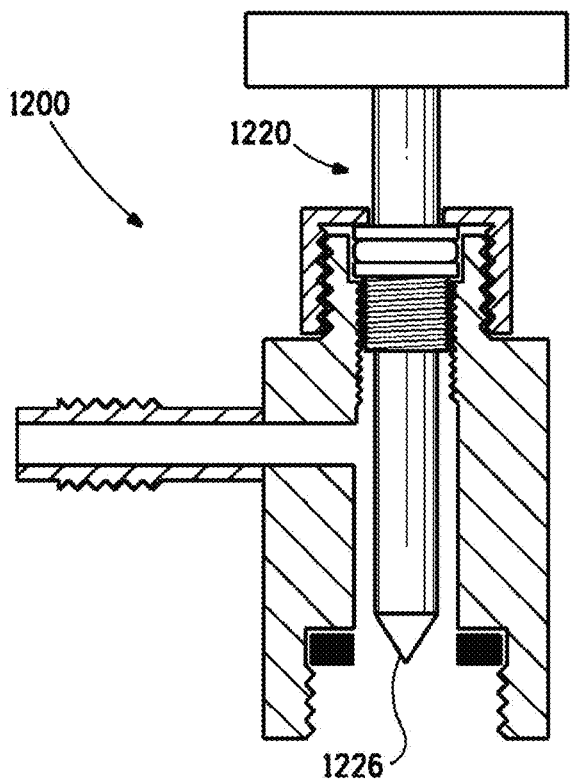
FIG. 12 shows a partial cutaway view of an existing can tap of the prior art.
Figure 13:
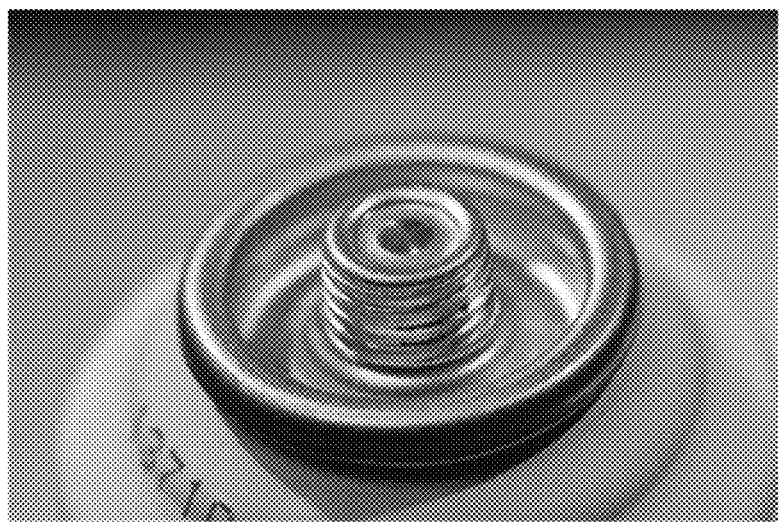
FIG. 13 shows an existing can having a metal seal of the prior art.
Figure 14:
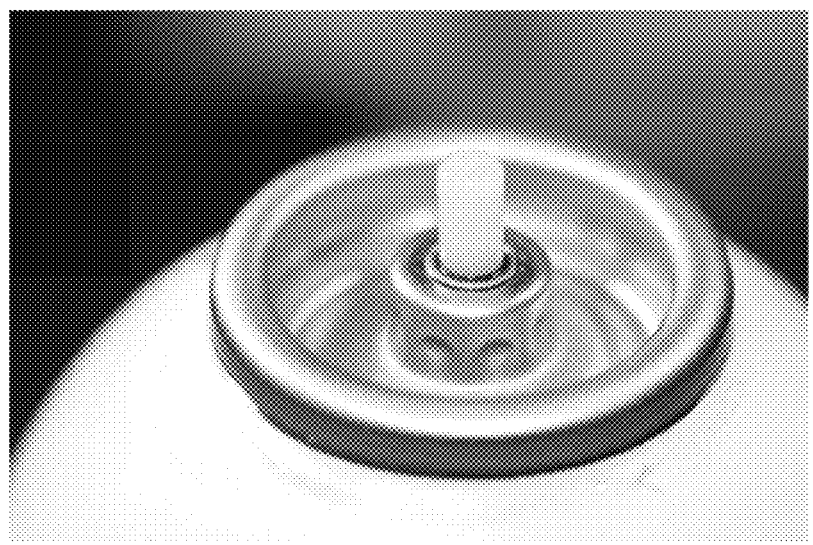
FIG. 14 shows an existing external spring-actuated plug self-sealing can of the prior art.
Figure 15:
FIG. 15 shows an existing internal spring-actuated plug self-sealing can of the prior art.

A piercing-style can tap, as shown in FIG. 12, was used under the same conditions as Example 1. The flow rate ranged from 0 g/sec to about 0.8 g/sec. The piercing-style can tap rendered the valve unusable.

Many aspects and embodiments have been described above and are merely exemplary and not limiting. After reading this specification, skilled artisans appreciate that other aspects and embodiments are possible without departing from the scope of the invention.

Other features and benefits of any one or more of the embodiments will be apparent from the preceding detailed description, and from the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

What is claimed is:

1. A can and tap system for dispensing refrigerants comprising:
    a can tap comprising:
    a housing having a body, a lower end having an inlet, an upper end having an outlet, a throat between the lower end and the upper end;
    a pin located within the housing having an upper end secured to the housing body, a lower end having a blunt depressor suitable for contact with a can having a top in which is positioned a self-sealing valve, wherein the blunt depressor is capable of operating the valve of the can, and a flow portion between the upper end and the lower end of the pin located within the housing throat wherein the flow portion allows fluid to flow between the housing and the pin wherein the pin has a rotatable handle and a gasket mounted around the pin maintaining a fluid-tight engagement between the pin and housing and the pin further comprises a pin limiter having at least one shoulder and the housing further comprises a stop positioned along a housing throat at the housing inlet wherein the at least one shoulder and the stop are sized such that the at least one shoulder contacts the stop to limit a distance the pin can descend when the pin is engaged;
    a gasket positioned adjacent to the housing at the housing inlet and further positioned so as to be capable of contacting a can when the tap is affixed to a can;
    a tap outlet in fluid communication with the housing outlet at the upper end of the housing; and
    wherein the can tap has a threaded portion which is affixed to a can through a threaded portion of the top of the can, wherein the can has an upraised crown with an opening through which depressor of the pin can pass,
    wherein the valve has an o-ring seal which seals the top of the valve and a plug which presses against the o-ring seal; and wherein the can and tap assembly can be attached and detached from a can.

2. The can and tap system of claim 1, wherein the flow portion of the pin has a dimension in a first direction perpendicular to the central axis of the pin that is greater than a dimension in a second direction perpendicular to the central axis of the pin.

3. The can and tap system of claim 2, wherein the flow portion of the pin has a dimension in a first direction perpendicular to the central axis of the pin that is at least twice as great as a dimension in a second direction perpendicular to the central axis of the pin.

4. The can and tap system of claim 3 wherein the first direction is rotated 90 degrees from the second direction.

5. The can and tap system of claim 2, wherein the flow portion has a flattened surface that allows fluid to pass over the flattened surface between the flow portion and the housing.

6. The can and tap system of claim 1, wherein the flow portion is rotationally symmetrical around the central axis of the pin.

7. The can and tap system of claim 6 wherein the flow portion is cylindrical.

8. The can and tap system of claim 1 wherein at least part of the flow portion has a dimension in a first direction perpendicular to the central axis of the pin that is greater than a dimension in a second direction perpendicular to the central axis of the pin and at least part of the flow portion is rotationally symmetrical around the central axis of the pin.

9. The can and tap system of claim 8 wherein at least part of the flow portion has a flattened surface and at least part of the flow portion is cylindrical.

10. The can and tap system of claim 1, wherein the gasket comprises an elastic material that at least partially but not completely compresses when the can tap is placed on the can.

11. The can and tap system of claim 1, wherein the can tap is capable of delivering a constant flow rate of at least 2.0 g/sec when the can has a starting pressure of 662 kPa (96 psia).

12. The can and tap system of claim 1, wherein the depressor has a blunt surface for contacting with a valve of a can.

13. The can and tap system of claim 12, wherein the blunt surface of the depressor is flat, curved, faceted, or dully pointed.

14. The can and tap system of claim 12 or 13 wherein the depressor has straight sides.

15. The can and tap system of claim 12 or 13 wherein the depressor has curved sides.

16. The can and tap assembly of claim 1 wherein the can is an internal spring-actuated plug self-sealing can.

17. A can tap for dispensing refrigerants from pressurized containers comprising:
    a housing having a body, a lower end having an inlet, an upper end having an outlet, a throat between the lower end and the upper end;
    a pin located within the housing having an upper end secured to the housing body, a lower end having a blunt depressor suitable for contact with a can having a top in which is positioned a self-sealing valve, wherein the blunt depressor is capable of operating the valve of the can, and a flow portion between the upper end and the lower end of the pin located within the housing throat wherein the flow portion allows fluid to flow between the housing and the pin and wherein the flow portion is in fluid communication with the housing inlet and the housing outlet; and a tap outlet in fluid communication with the housing outlet at the upper end of the housing; and a gasket positioned adjacent to the housing at or near the housing inlet, wherein the gasket comprises a material having a hardness ranging 80 durometers to 90 durometers;

wherein the can tap has a threaded portion which is affixed to a can through a threaded portion of the top of the can, wherein the can has an upraised crown with an opening through which depressor of the pin can pass, wherein the valve has an o-ring seal which seals the top of the valve and a plug which presses against the o-ring seal;

wherein the can tap can be attached and detached from a can; and wherein the pressurized container is an internal spring-actuated plug self-sealing can.

18. The can tap of claim 17, wherein the flow portion of the pin has a dimension in a first direction perpendicular to the central axis of the pin that is greater than a dimension in a second direction perpendicular to the central axis of the pin.

19. The can tap of claim 18, wherein the flow portion has a flattened surface that allows fluid to pass over the flattened surface between the flow portion and the housing.

20. The can tap of claim 17, wherein the flow portion is rotationally symmetrical around the central axis of the pin.

21. The can tap of claim 17, wherein the pin has a pin limiter positioned along the flow portion of the pin for limiting the distance the pin may descend when the pin is engaged.

22. The can tap of claim 21, wherein the pin limiter is at least one shoulder and the housing further comprises a stop positioned along the housing throat at or near the housing inlet wherein the at least one shoulder and the stop are sized such that the at least one shoulder contacts the stop to limit a distance the pin can descend when the pin is engaged.

\* \* \* \* \*